Patented Jan. 23, 1934

1,944,241

UNITED STATES PATENT OFFICE 1,944,241

HYDROGENATED METHYL ABIETATE AND METHOD OF PRODUCING

Irvin W. Humphrey, Wilmington, Del., assignor to Hercules Powder Company, Wilmington, Del., a corporation of Delaware No Drawing. Application June 3, 1931
Serial No. 541,953

14 Claims. (Cl. 260—98)

This invention relates to hydrogenated methyl abietate and to a novel method for its production.

The hydrogenated methyl abietate in accordance with this invention will be found to be a product lending itself to wide and varied use in the commercial arts, as a high boiling ester of excellent solubility characteristics for use in protective coatings, as a non-drying oil, etc.

The hydrogenated methyl abietate in accordance with this invention may be prepared by the hydrogenation of methyl abietate prepared in any suitable manner by the esterification of abietic acid, as such or as found in, for example, rosin.

In proceeding in accordance with this invention, methyl abietate is hydrogenated by treatment with hydrogen in the presence of an active nickel hydrogenation catalyst under suitable temperature, say 140° C. to 250° C., or preferably 150° C. to 200° C. and under a pressure of about 10-500 atmospheres, or preferably say 15-100 atmospheres. In effecting the hydrogenation the treatment may involve hydrogenation to approximately one double bond in the presence of a nickel hydrogenation catalyst followed by completion of the saturation in the presence of a platinum or palladium catalyst.

The catalyst, as powdered nickel, may be prepared in any usual manner, as by oxidation and then reduction, and will desirably be supported on a suitable support as kieselguhr, pumice, or the like.

Further, in proceeding in accordance with the invention the methyl abietate may be isomerized, as for example, by heat treatment or by treatment with chemical reagents, as sulphuric acid, hydrochloric acid, etc., before hydrogenation.

The methyl abietate may be prepared by heating methanol and rosin (abietic acid) at a temperature of about 225° C.–290° C. under a pressure of about 1200–2000 lbs. without use of a catalyst, or by autoclaving methyl chloride with sodium abietate in solution in a solvent, as ethyl, methyl or butyl alcohol, or otherwise.

As illustrative of the hydrogenation of the methyl abietate, for example, a quantity of methyl abietate is agitated with about 1.5% of a powdered nickel hydrogenation catalyst for two hours at a temperature of about 185° C. while introducing hydrogen under a pressure of about 40 atmospheres. The product will be about 65% saturated with hydrogen. Similarly the hydrogenation may be effected at a temperature of about 150° C. while introducing hydrogen under a pressure of about 200 atmospheres. The product will be highly saturated, being over 80% saturated.

As illustrative of the practical adaptation of the method of this invention where partial saturation is accomplished in the presence of a nickel catalyst followed by further saturation in the presence of a platinum catalyst, for example, methyl abietate is treated with hydrogen under a pressure of about 20 atmospheres at a temperature of about 160° C. while being agitated vigorously with about 2% of powdered nickel hydrogenation catalyst. The treatment is continued for about three-quarters of an hour and a product saturated to about 55% is obtained. The partially saturated methyl abietate is then treated with hydrogen at a temperature of about 30° C. and under a pressure of about 100 atmospheres in the presence of a platinum catalyst, effecting more complete saturation.

If desired the methyl abietate may be passed with hydrogen over a stationary nickel hydrogenation catalyst, having an activated surface prepared by oxidation and reduction, under the temperature and pressure conditions indicated until partially saturated, and then over a stationary platinum catalyst, under the temperature and pressure conditions indicated, until the desired percentage of saturation is obtained.

If desired, the methyl abietate may be hydrogenated in the vapor phase by passing its vapors together with hydrogen over an activated nickel or platinum catalyst. In vapor phase hydrogenation the methyl abietate will be heated to say 50° C. to 350° C. under a pressure of say 1–760 mm. mercury to vaporize it and will be passed over the nickel catalyst with hydrogen at a temperature of say 150° C.–225° C. and under the same pressure conditions.

When desired the methyl abietate may be isomerized, as for example, by heating with a small proportion of an acid, as hydrochloric acid, dilute sulphuric acid, etc. or by heating to a temperature within about the range of 225° C.–300° C. and then hydrogenating.

The hydrogenated methyl abietate embodying this invention is highly advantageous as an ingredient in lacquers, since it is compatible with nitrocellulose and the various other usual ingredients of lacquers and will give desirable qualities to the lacquer film. As typical of its use in a lacquer, for example, a desirable lacquer may be made up on the following formula:

| | Per cent |
|---|---|
| Nitrocellulose (desirably of a viscosity of ½ second) | 10.0 |
| Hydrogenated methyl abietate | 8.5 |
| Toluene | 30.0 |
| Ethyl acetate | 7.0 |
| Butyl acetate | 26.0 |
| Butanol and ethyl alcohol | 10.0 |
| Gum damar solution | 8.5 |

In the above formula it will be understood that various well known solvents, diluents, gums, etc. may be substituted for those specified.

In proceeding in accordance with this invention the nickel catalyst will desirably contain some nickel oxide and may contain considerable proportions of copper, cobalt or the like. Further, a base metal catalyst, as zinc oxide, chromium oxide, etc., may be employed.

In accordance with this invention it will be found that methyl abietate may be hydrogenated to the tetrahydro stage.

The coating composition disclosed herein is not specifically claimed herein, since such forms the subject-matter of an application for United States Letters Patent filed by me as a division hereof, Serial No. 605,120, filed April 13, 1932.

What I claim and desire to protect by Letters Patent is:

1. Tetrahydromethyl abietate.

2. The method of hydrogenating methyl abietate which includes subjecting methyl abietate to treatment with hydrogen at a temperature of 140° C.–250° C. and under a pressure of 15–100 atmospheres in the presence of a nickel hydrogenation catalyst.

3. The method of hydrogenating methyl abietate which includes subjecting methyl abietate to treatment with hydrogen at a temperature of 140° C.–250° C. and under a pressure of 100–500 atmospheres in the presence of an active nickel hydrogenation catalyst.

4. The method of hydrogenating methyl abietate which includes subjecting methyl abietate to treatment with hydrogen at a temperature of 150° C.–200° C. and under a pressure of 15–100 atmospheres in the presence of an active nickel hydrogenation catalyst.

5. The method of hydrogenating methyl abietate which includes subjecting methyl abietate to treatment with hydrogen under temperature and pressure conditions which will promote the addition of hydrogen to unsaturated bonds of the methyl abietate in the presence of a nickel hydrogenation catalyst until partially saturated with hydrogen and then subjecting the partially hydrogenated methyl abietate to treatment with hydrogen in the presence of a platinum catalyst until the percentage of saturation with hydrogen is increased.

6. The method of hydrogenating methyl abietate which includes subjecting methyl abietate to treatment with hydrogen at a temperature of 140° C.–250° C. and under a pressure of 10–500 atmospheres in the presence of a nickel hydrogenation catalyst until partially saturated with hydrogen, then subjecting the partially hydrogenated methyl abietate to treatment with hydrogen and under a pressure of 10–500 atmospheres in the presence of a platinum catalyst until the percentage of saturation with hydrogen is increased.

7. The method of hydrogenating methyl abietate which includes subjecting methyl abietate in vapor phase to treatment with hydrogen at a temperature at which the addition of hydrogen to unsaturated bonds of the methyl abietate will be promoted in the presence of a hydrogenation catalyst.

8. The method of hydrogenating methyl abietate which includes subjecting methyl abietate in vapor phase to treatment with hydrogen at a temperature at which the addition of hydrogen to unsaturated bonds of the methyl abietate will be promoted in the presence of a stationary activated nickel hydrogenation catalyst.

9. The method of hydrogenating methyl abietate which includes isomerizing methyl abietate and then treating the isomerized abietate with hydrogen under temperature and pressure conditions which will promote the addition of hydrogen to unsaturated bonds of the methyl abietate in the presence of an active hydrogenation catalyst.

10. The method of hydrogenating methyl abietate which includes isomerizing methyl abietate and then treating the isomerized abietate with hydrogen at a temperature of 140° C.–250° C. and under a pressure of 10–500 atmospheres in the presence of an active nickel hydrogenation catalyst.

11. The process of preparing hydrogenated methyl abietate which includes esterifying abietic acid with methanol and then hydrogenating the methyl abietate in the presence of an active nickel hydrogenation catalyst at a temperature of 150° C. to 200° C. and under a pressure of 15–100 atmospheres.

12. The method of hydrogenating methyl abietate which includes isomerizing methyl abietate and then treating the isomerized abietate with hydrogen at a temperature of 140° C. to 250° C. and under a pressure of 10–500 atmospheres in the presence of an active base metal hydrogenation catalyst.

13. Hydrogenated methyl abietate, the unsaturated bonds of which are about 80% saturated with hydrogen.

14. The method of hydrogenating methyl abietate which includes subjecting methyl abietate to treatment with hydrogen at a temperature of 140° C.–250° C. and under a pressure of 10–500 atmospheres in the presence of a non-noble metal hydrogenation catalyst.

IRVIN W. HUMPHREY.